United States Patent
Schmitt-Lewen et al.

(10) Patent No.: US 11,453,167 B2
(45) Date of Patent: Sep. 27, 2022

(54) METHOD FOR PROVIDING CODES ON COMPONENTS DURING A 3D MANUFACTURING PROCESS

(71) Applicant: HEIDELBERGER DRUCKMASCHINEN AG, Heidelberg (DE)

(72) Inventors: Martin Schmitt-Lewen, Heidelberg (DE); Guido Hierl, Sandhausen (DE); Andreas Mueller, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 391 days.

(21) Appl. No.: 16/701,467

(22) Filed: Dec. 3, 2019

(65) Prior Publication Data
US 2020/0171749 A1    Jun. 4, 2020

(30) Foreign Application Priority Data
Dec. 3, 2018   (DE) .................. 10 2018 220 789

(51) Int. Cl.
*B29C 64/30*     (2017.01)
*B29C 64/386*    (2017.01)
*B33Y 50/00*     (2015.01)
*B33Y 40/20*     (2020.01)

(52) U.S. Cl.
CPC .......... *B29C 64/30* (2017.08); *B29C 64/386* (2017.08); *B33Y 40/20* (2020.01); *B33Y 50/00* (2014.12)

(58) Field of Classification Search
CPC ..... B29C 64/30; B29C 64/386; B29C 64/153; B33Y 10/00; B33Y 50/00; B33Y 40/20
See application file for complete search history.

(56) References Cited

U.S. PATENT DOCUMENTS

| | | | |
|---|---|---|---|
| 7,922,272 B2 * | 4/2011 | Baird | B41J 3/4073 118/305 |
| 8,485,860 B2 | 7/2013 | Oliver et al. | |
| 9,656,428 B2 | 5/2017 | Voris et al. | |
| 10,906,247 B2 | 2/2021 | Flores et al. | |
| 2012/0183701 A1 | 7/2012 | Pilz et al. | |
| 2012/0203365 A1 * | 8/2012 | Hummeler | B28B 1/001 700/98 |
| 2017/0348899 A1 | 12/2017 | O'Neill et al. | |
| 2018/0010458 A1 * | 1/2018 | Chabane | F01D 5/18 |
| 2018/0099300 A1 | 4/2018 | Dufort et al. | |

FOREIGN PATENT DOCUMENTS

| | | |
|---|---|---|
| CN | 101743094 A | 6/2010 |
| CN | 105398055 A | 3/2016 |
| CN | 105938569 A | 9/2016 |
| CN | 107930903 A | 4/2018 |
| DE | 102009043317 A1 | 3/2011 |
| DE | 202015005115 U1 | 8/2015 |
| WO | 2011036087 A1 | 3/2011 |

* cited by examiner

*Primary Examiner* — Michael P Wieczorek
(74) *Attorney, Agent, or Firm* — Laurence A. Greenberg; Werner H. Stemer; Ralph E. Locher

(57) ABSTRACT

A method is provided for controlling the subsequent treatment of a workpiece that has previously been manufactured in an additive manufacturing process and has had marks formed thereon during the additive manufacturing process. The marks are used to control the application or ablation of material in the subsequent treatment of the workpiece.

8 Claims, 1 Drawing Sheet

METHOD FOR PROVIDING CODES ON COMPONENTS DURING A 3D MANUFACTURING PROCESS

CROSS-REFERENCE TO RELATED APPLICATION

This application claims the priority, under 35 U.S.C. § 119, of German Patent Application DE 10 2018 220 789.5, filed Dec. 3, 2018; the prior application is herewith incorporated by reference in its entirety.

BACKGROUND OF THE INVENTION

Field of the Invention

The present invention relates to a method for controlling the subsequent treatment of a workpiece that has previously been manufactured in an additive manufacturing process and has received marks during the additive manufacturing process.

A workpiece manufactured in an additive manufacturing process, which is frequently also referred to as 3D printing, is disclosed in German Utility Model DE 20 2015 005 115 U1. The workpiece disclosed in that utility model is manufactured in a 3D printing process and may be provided with different artificial features during the 3D printing process, among them one-dimensional codes, multidimensional codes, magnetic codes, mechanical codes, optical codes, and electronic codes. The disclosed mechanical codes in particular include bar codes formed on the workpiece as depressions or openings. As an alternative, raised bar codes are disclosed, which present themselves as protrusions formed on the surface of the workpiece. Those marks allow workpieces produced by 3D printing to be unequivocally identified. The codes formed in the workpiece are entered into a database that is used in the printing process for manufacturing the workpiece. In that way, the printing data for the 3D print are modified in a corresponding way to create the depressed or raised code on the workpiece.

SUMMARY OF THE INVENTION

It is accordingly an object of the invention to provide a method for providing codes on components during a 3D manufacturing process, which overcomes the hereinaforementioned disadvantages of the heretofore-known methods of this general type and which automates and simplifies the further processing of workpieces that have been manufactured in an additive manufacturing process.

With the foregoing and other objects in view there is provided, in accordance with the invention, a method for controlling the subsequent treatment of a workpiece that has previously been manufactured in an additive manufacturing process and has had marks formed thereon during the additive manufacturing process, wherein the marks are used to control the application or ablation of material in the subsequent treatment of the workpiece.

Thus, the marks that are created on the workpieces during the additive manufacturing process are used not only to identify the workpiece as is known in the art, but also to control the process of applying or ablating material, in particular by varnishing or grinding processes, in further processing operations of the workpieces.

In accordance with a first embodiment of the invention, the marks in the workpiece are depressions. These depressions are used to control the ablation of material from a workpiece manufactured in an additive manufacturing process. The depth of the depressions may control the ablation process inasmuch as the surface of the workpiece is subjected to an ablation process such as grinding or milling until the depressions are no longer visible. In this process, the visibility of the depressions may be assessed either visually by an operator of the machine for ablating the material, automatically by an optical sensor that measures the depressions, or else by a tactile sensor that assesses the depressions by touch. In particular, if a mark has multiple different depressions, it is possible for the ablation process to be stopped before all depressions have disappeared, causing some depressions to remain as visible and tactile permanent features after the treatment.

In accordance with a different embodiment of the invention, the marks in the workpiece are protrusions. These protrusions may be used to control processes that apply material such as varnishing or printing processes. The height of the protrusions defines the amount of varnish or printing ink to be applied to the workpiece. For instance, varnish or printing ink may be applied to the workpiece until the protrusions can no longer be felt or seen. This aspect may likewise be visually assessed by an operator of the machine for varnishing or printing or by an optical or tactile sensor.

In accordance with a particularly advantageous embodiment of the invention, the mark has both protrusions and depressions. In this case, a mark that includes both a protrusion and a depression may control both a process of applying material and a process of ablating material.

In accordance with a further embodiment of the invention the marks are protrusions of different heights and for every one of the protrusions of different height, a layer of varnish or printing ink of corresponding thickness is applied by the varnishing machine, printing machine or varnishing unit. For instance, if there are five protrusions of different heights formed on the workpiece, the first layer of varnish is applied until the first protrusion has disappeared. The second layer of varnish is applied until the second protrusion has disappeared. The process is repeated until the last protrusion has disappeared, which means that the last layer of varnish has been applied. Above all, the last layer may be applied in a printing process such as inkjet printing, which not only smooths the surface but also applies a print. It is also possible for one of the middle layers to be a printed layer, which is then covered by layers of a transparent varnish. Thus, the printed image is protected but visible on the outside. Due to their different dimensions, the protrusions of different heights may thus easily control the application of multiple layers of varnish including a corresponding primer. For this purpose, too, the protrusions may be recorded in an optical, visual, or tactile way, in particular by cameras or tactile sensors. Thus, a varnishing machine may apply multiple layers of varnish or primer in a fully automated way by using a camera due to the protrusions of different heights. In particular, if a mark has multiple protrusions of different heights, it is possible for the application process to be stopped before all protrusions have vanished, causing some protrusions to remain as visible and tactile permanent features after the treatment.

In accordance with a further embodiment of the present invention the marks for controlling the application or ablation of material during a subsequent treatment of the workpiece include additional encoded information on the treatment of the workpiece such as the thickness of the layer of varnish and the type of varnish information that is read out during the subsequent treatment process by a reading device, in particular in an optical process. In this case the marks are not only used to control the application or ablation of material but also to convey additional information, for instance in the form of a bar code or other visually recognizable code, that is required for the further processing of the workpiece, for instance the type of varnish that was used. In this case, the information on the type of varnish to be applied to the workpiece may automatically be transmitted to the control unit of a varnishing machine by using a sensor such as a camera provided in the varnishing machine to read the applied mark. In addition, information for identifying the workpiece may likewise be integrated into the mark as is the case in the prior art, allowing the machine for applying or ablating material to unequivocally identify the workpiece. Thus, it is possible to use marks both for controlling the application or ablation of material and for other purposes during further processing operations.

Other features which are considered as characteristic for the invention are set forth in the appended claims.

Although the invention is illustrated and described herein as embodied in a method for providing codes on components during a 3D manufacturing process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1B:
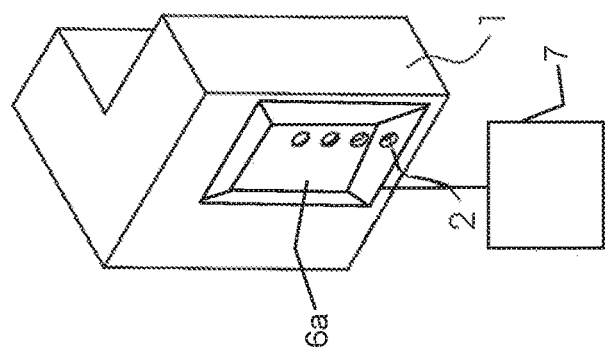
FIG. 1B is a perspective view of a workpiece manufactured in a 3D printing process and having four different depressions.
Figure 1A:
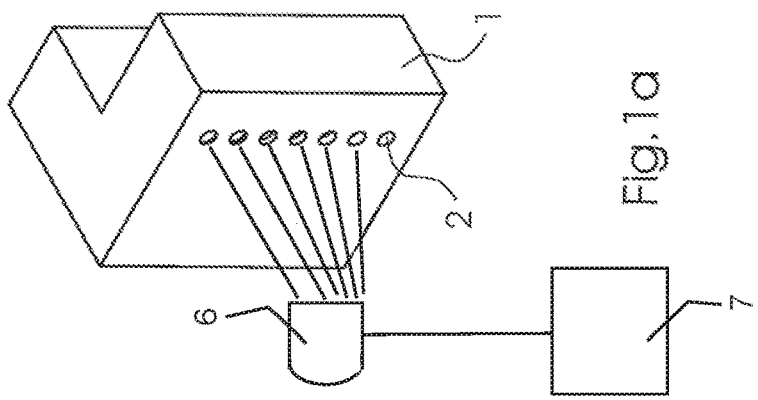
FIG. 1A is a diagrammatic, perspective view of a workpiece manufactured in a 3D printing process and having seven different depressions.

Referring now to the figures of the drawings in detail and first, particularly, to FIGS. 1A and 1B thereof, there are seen workpieces 1 which have different numbers of depressions 2 used to control material ablation processes. The depressions 2 are used to smooth the workpiece 1 in a defined way because, having been manufactured in a 3D printing process, the workpiece 1 initially has a very rough surface. The various depressions may now be used to control different smoothing processes. For instance, two smoothing processes using different-grain grinding materials may be carried out. The first grinding process is continued until the first depression is no longer visible. Then the second grinding process is started by using a different-grain grinding material and the workpiece 1 is ground until the deeper second mark is no longer visible. Further grinding processes using different-grain grinding materials may follow until all seven depressions (FIG. 1A) or all four depressions (FIG. 1B) are no longer visible. FIGS. 1A and 1B indicate that a number of different depressions 2 may be used to precisely control an ablation or grinding process in several stages. In this process, the depressions 2 are either visually assessed by an operator of the grinding machine or they are scanned by a camera 6 or tactile sensor 6a that detects the disappearance of a depression 2 and then changes the grinding process in a corresponding way. Once the grinding process has been completed, the depressions 2 have disappeared completely in any case, and no more marks are visible on the workpiece 1.

Figure 2:
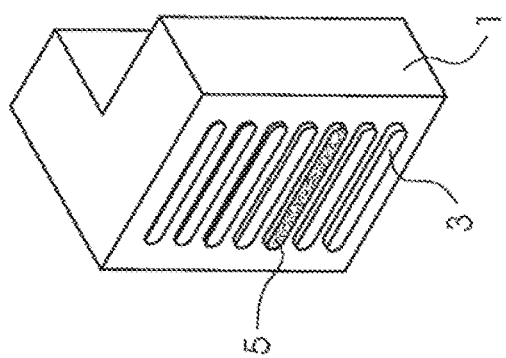
FIG. 2 is a perspective view of a workpiece manufactured in a 3D printing process and having seven different protrusions.

The workpiece 1 shown in FIG. 2 has seven raised flat portions 3 of different sizes. The raised portions 3 are preferably disposed in a systematic order, from the lowest protrusion to the highest protrusion. In this case, too, one may assume that the surface of the workpiece 1 is rough. In this case, however, the surface is modified by an application of a primer and varnishes. In most cases, varnish is applied for protection or decorative purposes. For instance, an opaque primer and then an additional clear varnish may be applied. Two protrusions 3 would be sufficient for this purpose. The seven protrusions 3 shown in FIG. 2 may be used to apply up to six layers of varnish and an additional primer. In this case, too, the application of the layers of varnish may be visually analyzed by the operator of the varnishing machine. Alternatively, a sensor such as a camera may be provided to detect the disappearance of the protrusion 3 in the layer of varnish and may thus control the transition to the next layer of varnish. It is also possible for one of the layers of varnish, preferably the top layer, to be applied in a printing operation such as inkjet printing. Therefore, a workpiece 2 may receive any desired print. The thickness of the printed layer is likewise controlled by a protrusion 3. It is likewise possible to replace a layer of varnish in the middle by a printed layer, which may then be protected by layers of clear varnish placed on top. A control unit 7 is used to control the application or ablation of material during the subsequent treatment of the workpiece.

One of the protrusions of FIG. 2 has a dark color, thus forming a colored protrusion 5 contrasting with the workpiece 1. This colored protrusion 5 is visible in a layer of clear varnish, for example, even if the colored protrusion 5 is completely surrounded by the clear varnish or even covered by it. This is a way to create a contrasting mark that can no longer be felt after the treatment step but remains visible as a permanent mark on the workpiece 1.

Figure 3:
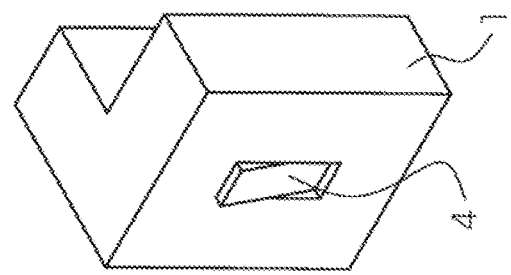
FIG. 3 is a perspective view of a workpiece manufactured in a 3D printing process and having a combination mark formed of a depression and a protrusion.

FIG. 3 illustrates a workpiece 1 that has a combined mark 4. Such a combined mark 4 may be used to control both an ablation process and a process that applies material.

LIST OF REFERENCE NUMERALS 1 workpiece
2 depression
3 protrusion
4 combined mark
5 colored protrusion
6 camera 6
6a tactile sensor
7 control unit

The invention claimed is:

1. A method for controlling a subsequent treatment of a workpiece, the method comprising the following steps:
    providing a workpiece having been previously manufactured in an additive manufacturing process and having had marks formed thereon during the additive manufacturing process;

using the marks to control an application or ablation of material in the subsequent treatment of the workpiece;
providing the marks in the workpiece as protrusions;
using the protrusions to control an application of varnish or printed images in a varnishing unit, a printing unit or a varnishing machine; and
providing the protrusions with different heights, and using each one of the protrusions of different heights to cause a respective layer of varnish or printing ink of a corresponding thickness to be applied by the varnishing machine, printing machine or varnishing unit.

2. The method according to claim 1, which further comprises providing the marks as both the protrusions and as depressions.

3. The method according to claim 2, which further comprises using the depressions to control a grinding of a surface of the workpiece.

4. The method according to claim 1, which further comprises recording the marks during the subsequent treatment by using a camera of a machine carrying out an application or ablation of material in the subsequent treatment of the workpiece.

5. The method according to claim 1, which further comprises providing the protrusions with a color contrasting with the workpiece.

6. A method for controlling a subsequent treatment of a workpiece, the method comprising the following steps:
providing a workpiece having been previously manufactured in an additive manufacturing process and having had marks formed thereon during the additive manufacturing process;
using the marks to control an application or ablation of material in the subsequent treatment of the workpiece; and
recording the marks by touch.

7. A method for controlling a subsequent treatment of a workpiece, the method comprising the following steps:
providing a workpiece having been previously manufactured in an additive manufacturing process and having had marks formed thereon during the additive manufacturing process;
using the marks to control an application or ablation of material in the subsequent treatment of the workpiece;
using a control unit for controlling the application or ablation of material during the subsequent treatment of the workpiece;
including additional encoded information in the marks regarding the treatment of the workpiece;
using a reading device to read out the additional encoded information; and
including a thickness of a layer of varnish and a type of varnish in the additional encoded information.

8. The method according to claim 2, which further comprises using the reading device in an optical process.

* * * * *